Nov. 20, 1956 S. FASO 2,771,146
SAFETY DEVICE FOR FOUR WHEEL DRIVE VEHICLES HAVING
FRONT AND REAR AXLE DIFFERENTIALS
Filed Oct. 7, 1952 4 Sheets-Sheet 1
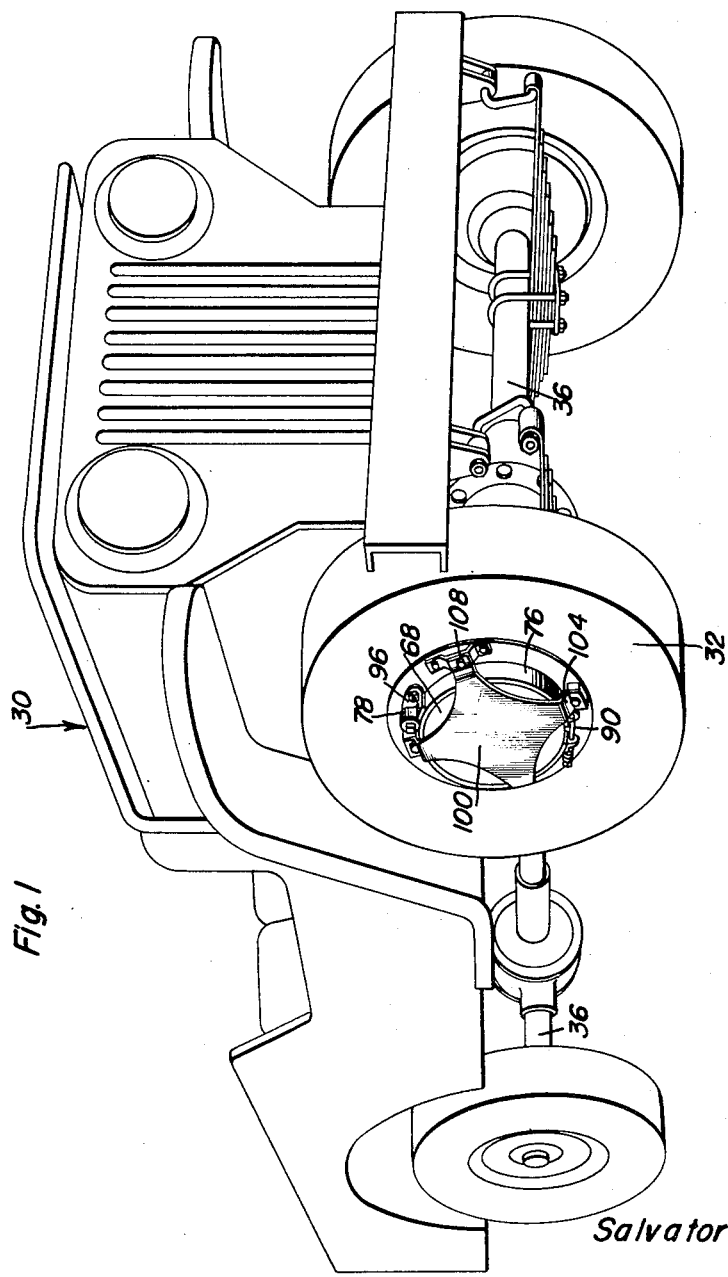
Salvatore Faso
INVENTOR.

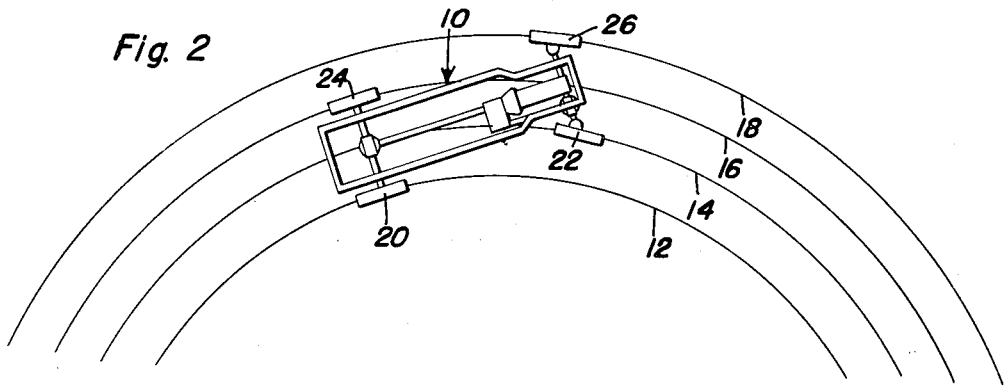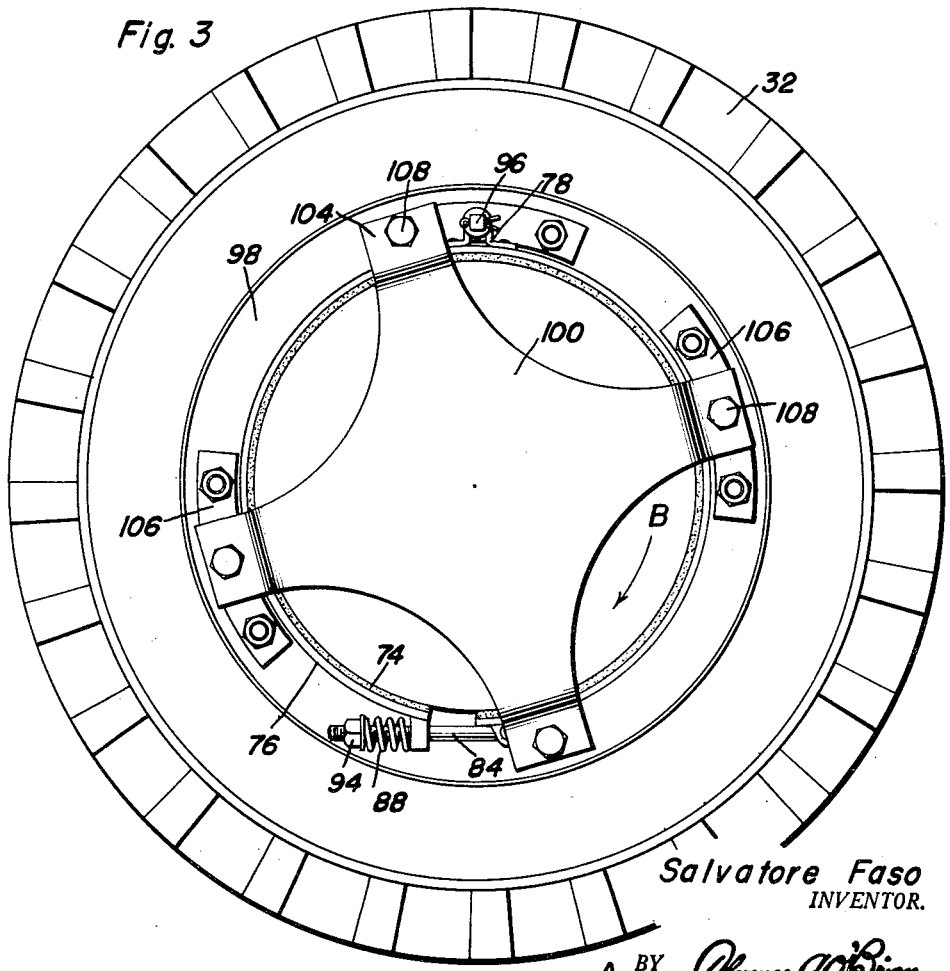

Salvatore Faso
INVENTOR.

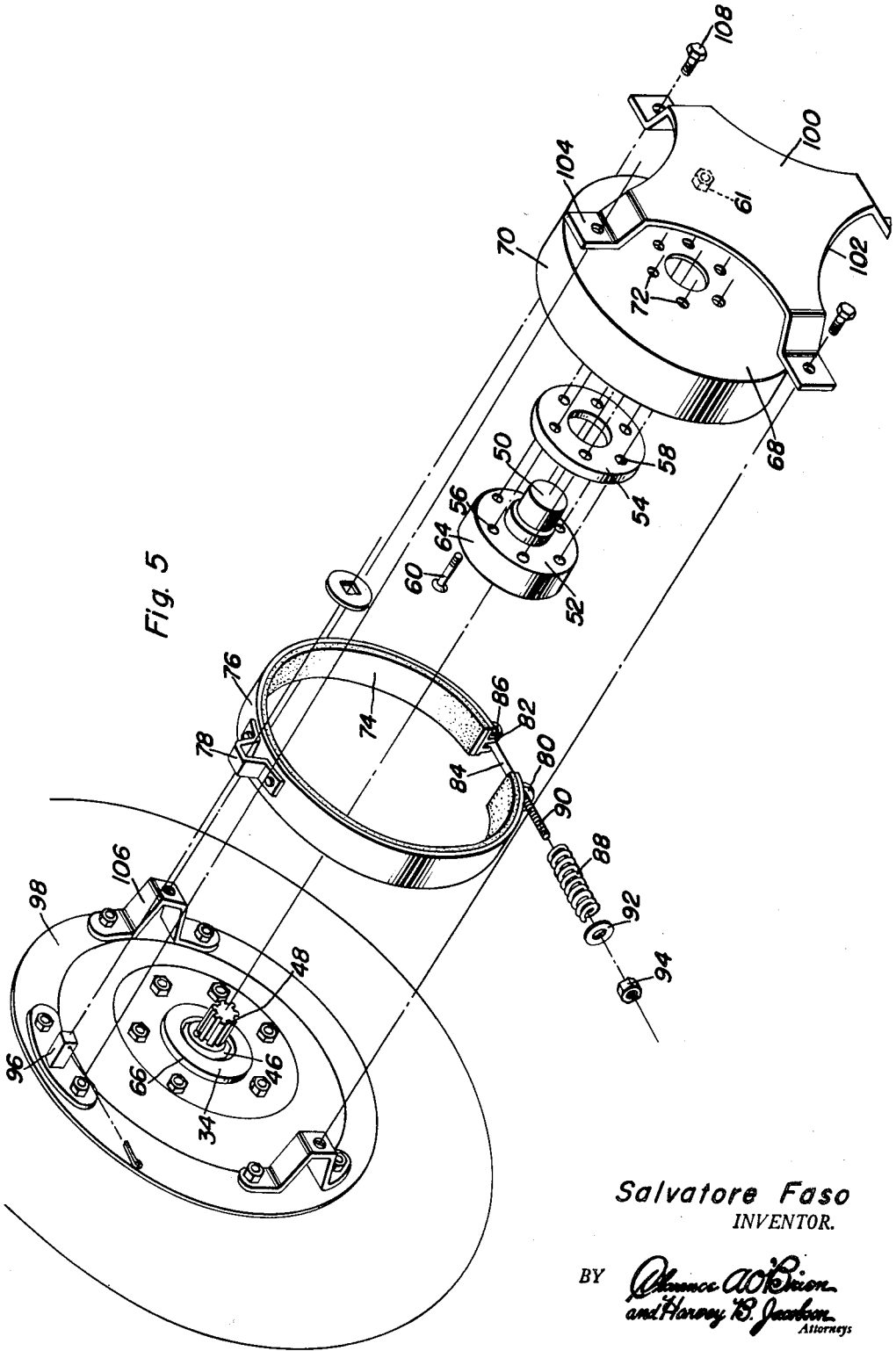

United States Patent Office 2,771,146
Patented Nov. 20, 1956

2,771,146

SAFETY DEVICE FOR FOUR WHEEL DRIVE VEHICLES HAVING FRONT AND REAR AXLE DIFFERENTIALS

Salvatore Faso, Madera, Calif.

Application October 7, 1952, Serial No. 313,397

6 Claims. (Cl. 180—44)

This invention comprises novel and useful improvements in a safety device for four wheel drive vehicles and more specifically relates to a yieldable friction coupling interposed between the source of power and one of the driving wheels of a four wheel drive vehicle.

It is well known that the four wheels of an automobile do not travel at the same rate of speed or through the same length of path of travel when the vehicle is making a turn. Accordingly, it has been customary to provide a differential mechanism in the driving axles of a vehicle to permit compensation for the difference in length of travel of the two wheels at the opposite ends of an axle during turning of the vehicle. Such constructions are also known in four wheel drives for vehicles wherein a front differential and a rear differential mechanism are provided in the front and rear axles respectively of the vehicle. However, although these mechanisms will compensate for the differences in length of travel of the two wheels of one axle, they do not compensate for the difference in the speed and length of travel of a front wheel and a rear wheel of a four wheel drive vehicle during turning of the latter. If such compensation is not provided, it is well known that excessive wear occurs upon the tires of the vehicle when the latter are traveling over a hard surface which provides adequate traction and minimizes any tendency to skid of the tires. In some instances, not only is excessive wear imparted to the tires to the driving mechanism of the four wheel drive, but in some instances even breakage occurs in the gears and other elements of the driving mechanism.

It is therefore the primary object of this invention to provide a safety device which may be readily incorporated into the driving connection of one of the wheels of a four wheel drive vehicle for overcoming the abovementioned difficulty.

A further object of the invention is to provide a safety device which shall be of simple and inexpensive construction, may be readily adjusted to provide a regulatable, predetermined overload or torque yielding resistance which will enable slippage of a wheel to compensate for the aforesaid differences in length and speed of travel of a wheel during turns, to thereby prevent the imposition of undue strains, wear and breakage upon the parts of a four wheel drive.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a perspective view of a four wheel drive vehicle incorporating therein the principles of this invention;

Figure 2 is a diagrammatic view illustrating the different paths of travel taken by the four wheels of a four wheel drive vehicle in making a turn;

Figure 3 is an enlarged side elevational view of a vehicle wheel showing the safety device of the present invention applied thereto;

Figure 5 is an exploded perspective view of the safety device construction of Figures 3 and 4.

Figure 4:
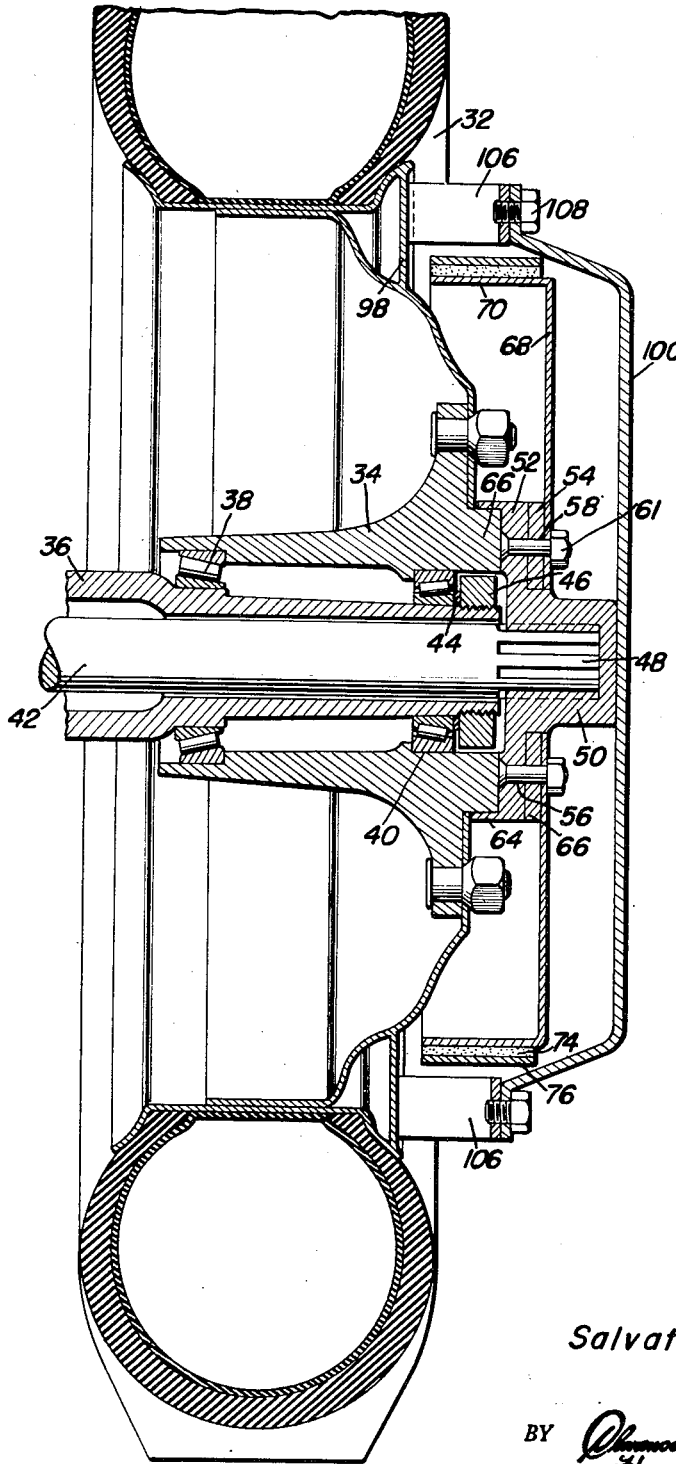
Figure 4 is a vertical transverse sectional view taken upon an enlarged scale through the wheel of Figure 3 and showing the construction of the safety device and its application to the wheel and axle.

It is well known in four wheel drive vehicles to provide differential mechanism upon each axle to allow compensation for differences of travel to occur between the wheels of that axle whereby the vehicle may negotiate turns without dragging one wheel or imposing undue strains on the driving mechanism of the wheels of the axle. However, in the conventional four wheel drive, there is a positive mechanical connection between the propeller shafts which drive the front and rear axles through the differential assemblies of the same. Consequently, no compensation between these propeller shafts is possible and since each of the four wheels of the vehicle, or at least the front and rear wheels of the vehicle travel in different paths at a different speed negotiating turns, an undesirable torque or strain is imposed upon this positive mechanical connection between the two axles. In the present invention, provision is made to permit relative yielding between these propeller shafts and the axles and wheels driven thereby so that compensation may be provided. In my safety device, this yielding or compensating mechanism consists of a friction clutch which may be applied to any one of the wheels and which will permit that wheel to have a limited, frictionally resisted relative movement with respect to its axle. This relative yielding movement will through the associated differential mechanism permit the other wheel of that axle to likewise readjust itself with respect to the strains and torques involved. Thus, I provide means whereby the front wheels may compensate themselves with respect to the rear wheels when making turns and thereby obviate the imposition of undue strains and overloads which would otherwise be directly applied with detrimental effects to the shafts and gearing connecting the four wheels to the power plants of the vehicle.

I have found it to be sufficient to apply my safety device to a single wheel of a four wheel drive vehicle to thereby provide compensation for all of the wheels. Obviously, any desired wheel may be supplied with this safety device, and if desirable the safety device may be applied to more than one wheel if desired.

Reference is now made to the accompanying drawings, wherein like numerals designate similar parts throughout the various views. Referring first to Figure 2, it will be seen that a four wheel drive vehicle 10 of any desired type has its four wheels travelling upon four different arcs or paths of travel indicated at 12, 14, 16 and 18, respectively for the four vehicle wheels 20, 22, 24 and 26 respectively.

From a study of the diagrammatic view of Figure 2 it will now be apparent that each and every wheel necessarily follows and traverses a path of different length while the vehicle negotiates a turn, this resulting necessarily in relative slippage of the wheels of the front axle when compared with the wheels of the rear axle. The two rear axle wheels through their differential mechanism are capable of compensating for this different length of travel, and therefore can revolve at different speeds with respect to each other whereby undue strain or slippage between these wheels will occur. Similarly, the front wheels are so compensated through their differential mechanism. However, by virtue of the positive mechanical connection between the front and rear axles, no such compensation is possible and therefore there will be relative slippage of the front wheels upon the ground with respect to the rear wheels.

Referring now to Figure 1 it will be seen that the numeral 30 designates generally a conventional automotive vehicle having a four wheel drive applied thereto. As shown in this figure, the right front wheel has applied thereto the safety device in accordance with this invention, but as above mentioned, could be equally incorporated in any other wheel of the vehicle as desired. The numeral 32 is employed to designate that wheel of the vehicle to which the safety device is applied and is so used throughout these drawings.

The safety device, as seen in more detail in Figures 3–5, includes a wheel supporting hub 34 which is rotatably journaled and mounted upon the vehicle tubular axle housing 36 as by means of anti-friction thrust bearings 38 and 40. Rotatably journaled in the axle housing 36 is the driving axle 42 of the wheel 32, and the hub 34 is rotatably journaled upon the axle housing 36 and secured thereto by means of a retaining washer 44 and a lock nut 46 which is threaded upon the housing and urges the washer against the bearing 40.

As so far described, it will be apparent that the hub 34 is mounted for rotation upon the axle housing 36. At its outer extremity, the axle 42 is provided with a diametrically reduced externally splined portion 48 upon which is seated the internally splined tubular portion 50 which extends axially from a plate 52. As will be apparent from Figures 4 and 5, plate 52 is engaged by an annulus or ring 54 and registering apertures 56 and 58 are provided in the plate 52 and ring 54 for the reception of removable fastening bolts 60 and nuts 61 which secure these parts together. By this means relative rotation between the axle 42, hub 50, ring 54, plates 52 and the hub 34 is possible and these elements are caused to rotate as a unit when power is applied to the axle in a manner to be now set forth.

The plate 52 is provided with a peripheral flange 64 which is adapted to embrace an annular boss 66 upon the extremity of the hub.

It will be particularly noted from Figure 4, as so far described, that the hub 34 is retained upon the axle housing and axle by the fastening nut 46, while the driving elements 50, 52 and 64 are non-rotatable but are axially slidable upon the axle. A cylindrical drum 68 having an annular rim or clutch flange 70 is provided with apertures 72 whereby the drum is fixedly secured to the ring 54 and plate 52 by the abovementioned fastening bolts 60. The exterior surface of the drum, which thus moves as a unit with the axle, plate and ring forms part of a friction clutch by engagement with the internal surface of a friction clutch lining 74 carried by a radially contracting clutch band 76. This band has a mounting bracket 78 secured thereto and is provided with a pair of lugs 80 and 82 upon adjacent ends of the band. An actuating rod 84 is pivoted to the lug 82 as by a pin 86, and slidably extends through an aperture in the lug 80. A compression spring 88 is received upon the screw threaded extremity of the rod 84, and is adjustably compressed thereon as by a washer 92 and an adjusting nut 94.

The above described construction is very similar to a conventional automobile brake band assembly, except that the device is utilized to provide an adjustable frictional drag upon the drum flange 70. The mounting bracket 78 is removably secured to an anchor post 96 which in turn is fixedly secured to a ring 98 forming a part of the demountable wheel construction 32. It will thus be apparent that the friction clutch band 76 is carried by and rotates with the wheel 32 while the clutch drum 68 is carried by and rotates with the axle and hub assembly.

A protective retaining cap 100 which may be in the form of a plate having cut-away side edges 102 and provided with angularly offset brackets 104 whereby the same is likewise secured to the abovementioned wheel rim 98. For this purpose, additional brackets 106 may be secured upon the wheel rim and the protective plate 100 removably secured thereto by removable fastening bolts 108. The plate 100 thus constitutes the sole retaining means whereby axial movement of the plate and hub 52, 50 from the axle is prevented since the central portion of the cap 100 bears against the end of the hub 50 as shown in Figure 4; and also serves to protect and cover the other parts of the safety device.

The operation of the device it is believed will now be readily apparent. With the spring 88 adjusted to exert any desired compressive force upon the clutch band 76, a frictional coupling is provided between the clutch driving member consisting of the band 76 and the wheel to which the same is rigidly secured. However, when a sufficient overload is applied to the driving clutch member, as by virtue of the stresses and strains set up when the vehicle turns a curve, a frictionally resistant slippage will occur i. e., the portions 80 and 82 will tend to separate against the pressure of spring 88, which will permit relative movement between the axle 42 and its corresponding wheel 32. This movement or slippage, on relative overrun between the drive and driven clutch members in either direction, as indicated by the arrows A and B of Figure 3, will compensate for the differences in travel and speed of the wheels during the curve and thus prevent damage to the driving connections of the wheels with a four wheel drive mechanism.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A vehicle including front and rear wheel assemblies, each of said wheel assemblies including differential gearing assemblies drivingly connected to respective front and rear axle assemblies through impeller shafts drivingly connected to a common power source, and a safety device operably connected to a wheel and driving axle of one of said wheel assemblies providing an over-load torque relieving means between the power source, differential gearing assemblies and axle assemblies, said safety device including a slipping over-load release coupling, said coupling being operatively interposed between said wheel and its driving axle, said wheel being maintained in fixed axial position with respect to said driving axle.

2. A vehicle including front and rear wheel assemblies, each of said wheel assemblies including differential gearing assemblies drivingly connected to respective front and rear axle assemblies through impeller shafts drivingly connected to a common power source, and a safety device operably connected to a wheel and driving axle of one of said wheel assemblies providing an over-load torque relieving means between the power source, differential gearing assemblies and axle assemblies, said safety device including a friction clutch including driving and driven members, the driving member fixedly secured to the driving axle for continuous rotation therewith and the driven member fixedly secured to said wheel for driving the same, said wheel being mounted in fixed axial position with respect to said driving member, said clutch being releasable on relative overrun of the wheel and the driving member.

3. A vehicle including front and rear wheel assemblies, each of said wheel assemblies including differential gearing assemblies drivingly connected to respective front and rear axle assemblies through impeller shafts drivingly connected to a common power source, and a safety device operably connected to a wheel and driving axle of one of said wheel assemblies providing an over-load torque relieving means between the power source, differential gearing assemblies and axle assemblies, said safety device including a friction clutch including driving and driven members, the driving member fixedly secured to the driving axle for continuous rotation therewith and the driven member fixedly secured to the wheel for driving the same, adjusting means operably connected between the driving and driven members for adjusting the frictional resistance of the driving and driven members, said wheel being mounted in fixed axial position with respect to said driving member, said clutch being releasable on relative overrun of the wheel and the driving member.

4. A vehicle including front and rear wheel assemblies, each of said wheel assemblies including differential gearing assemblies drivingly connected to respective front and rear axle assemblies through impeller shafts drivingly connected to a common power source, and a safety device operably connected to a wheel and driving axle of one of said wheel assemblies providing an over-load torque relieving means between the power source, differential gearing assemblies and axle assemblies, said safety device including, a wheel hub, a connecting member in splined engagement with said axle and retaining means rotatably securing said member to said hub, a friction clutch driving member secured to said connecting member, a friction clutch driven member frictionally engaged by said driving member, connecting means for fixedly securing said driven member to said wheel, said wheel hub being mounted in a fixed axial position with respect to said driving member, said clutch being releasable on relative overrun of the wheel and the driving member.

5. A vehicle including front and rear wheel assemblies, each of said wheel assemblies including differential gearing assemblies drivingly connected to respective front and rear axle assemblies through impeller shafts drivingly connected to a common power source, and a safety device operably connected to a wheel and driving axle of one of said wheel assemblies providing an over-load torque relieving means between the power source, differential gearing assemblies and axle assemblies, said safety device including a wheel hub, a connecting member in splined engagement with said axle and retaining means rotatably securing said member to said tub, a friction clutch driving member secured to said connecting member, a friction clutch driven member frictionally engaged by said driving member, means fixedly securing said driven member to said wheel, said first mentioned retaining means being secured to said wheel and rotatably engaging said connecting member, said wheel hub being mounted in fixed axial position with respect to said driving member, said clutch being releasable on relative overrun of the wheel and the driving member.

6. A vehicle including front and rear wheel assemblies, each of said wheel assemblies including differential gearing assemblies drivingly connected to respective front and rear axle assemblies through impeller shafts drivingly connected to a common power source, and a safety device operably connected to a wheel and driving axle of one of said wheel assemblies providing an over-load torque relieving means between the power source, differential gearing assemblies and axle assemblies, said safety device including a wheel hub, a connecting member in splined engagement with said axle and retaining means rotatably securing said member to said hub, a friction clutch driving member secured to said connecting member, a friction clutch driven member frictionally engaged by said driving member, means fixedly securing said driven member to said wheel, a cover plate enclosing the hub and axle and secured to the wheel, said cover plate constituting said retaining means, said wheel hub being mounted in fixed axial position with respect to said driving member, said clutch being releasable on relative overrun of the wheel and the driving member.

References Cited in the file of this patent

UNITED STATES PATENTS

| | | |
|---|---|---|
| 1,012,936 | Turon | Dec. 26, 1911 |
| 1,089,121 | Ewing | Mar. 3, 1914 |
| 1,377,685 | Hotchkiss | May 10, 1921 |
| 1,490,951 | Werner | Apr. 22, 1924 |
| 1,959,777 | Bosworth | May 22, 1934 |
| 2,105,918 | Herrington | Jan. 18, 1938 |
| 2,226,759 | Fitzner | Dec. 31, 1940 |
| 2,386,917 | Thornton | Oct. 16, 1945 |
| 2,620,235 | Butler | Dec. 2, 1952 |

FOREIGN PATENTS

| | | |
|---|---|---|
| 11,249 | Great Britain | 1912 |